United States Patent [19]
Gasson et al.

[11] 3,879,435

[45] Apr. 22, 1975

[54] PROCESS FOR THE PRODUCTION OF ACRYLONITRILE

[75] Inventors: Edward James Gasson, Dollar; Thomas Charles Korsnar, Polmont; Stanley Frederic Marrian, Fife, all of Scotland

[73] Assignee: BP Chemical International Limited, London, England

[22] Filed: Sept. 24, 1973

[21] Appl. No.: 400,199

[30] Foreign Application Priority Data
Oct. 5, 1972 United Kingdom............... 45959/72

[52] U.S. Cl. ............................................ 260/465.3
[51] Int. Cl. .......................................... C07c 121/02
[58] Field of Search ................................. 260/465.3

[56] References Cited
UNITED STATES PATENTS

| | | |
|---|---|---|
| 3,340,291 | 9/1967 | Barclay et al.................... 260/465.3 |
| 3,365,482 | 1/1968 | Khoobiar......................... 260/465.3 |
| 3,478,082 | 11/1969 | Huibers............................ 260/465.3 |
| 3,479,385 | 11/1969 | Huibers........................... 260/465 C |
| 3,541,129 | 11/1970 | Yamada et al................... 260/465.3 |
| 3,625,867 | 12/1971 | Yoshino et al............. 260/465.3 X |
| 3,678,091 | 7/1972 | Reulet et al. .................... 260/465.3 |
| 3,681,421 | 8/1972 | Barclay et al.................... 260/465.3 |

*Primary Examiner*—Joseph P. Brust
*Attorney, Agent, or Firm*—Brooks Haidt & Haffner

[57] ABSTRACT

Production of acrylonitrile by ammoxidation of propylene uses a catalyst which is an oxide composition containing antimony, titanium together with copper, magnesium, zinc, chromium, manganese, molybdenum, tungsten, iron, cobalt, nickel, indium, arsenic, bismuth, tellurium and/or vanadium.

6 Claims, No Drawings

PROCESS FOR THE PRODUCTION OF ACRYLONITRILE

The present invention relates to the production of unsaturated nitriles and in particular to the production of acrylonitrile. Processes for the production of acrylonitrile by the vapour phase catalytic reaction of propylene, molecular oxygen and ammonia are known. The catalyst for use in such processes in general comprises compositions containing one or more polyvalent metals suitably compounded in the form of oxides. Thus, for example, British Pat. No. 987,960 (The Distillers Company Limited) describes a catalyst suitable for use in catalysing vapour phase catalytic reaction of propylene, molecular oxygen and ammonia, which catalyst comprises an oxide composition containing antimony, and titanium.

It is an object of the present invention to provide an improved process for the production of acrylonitrile using a catalyst containing antimony and titanium.

Accordingly, the present invention is a process for the production of acrylonitrile which comprises reacting at an elevated temperature in the vapour phase propylene, molecular oxygen and ammonia over a catalyst which is an oxide composition comprising antimony and titanium with, in addition, one or more of the oxides of the metals copper, magnesium, zinc, chromium, manganese, molybdenum, tungsten, iron, cobalt, nickel, indium, arsenic, bismuth, tellurium and vanadium.

The oxide composition catalysts of the present invention may be regarded either as mixtures of the oxides of the various metal components or as oxygen-containing compounds of such metals; under the reaction conditions either or both forms may be present. The catalyst may be prepared for instance by intimately mixing the oxides or compounds yielding the oxides on heating, or coprecipitation of the oxides, hydrated oxides or insoluble salts from an aqueous solution.

The proportions of the various conponents may vary within a moderately wide range. Thus, for example, suitable proportions are antimony to titanium in atomic ratio 2/1 to 24/1 and antimony to each additional metal in the ratio 2/1 to 24/1.

It is preferred to give the catalyst a prior heat-treatment, for instance at a temperature between 550° and 1,100°C in a molecular oxygen-containing gas.

The reaction of propylene with oxygen and ammonia over the catalysts may be carried out in any suitable manner, for instance as a fixed bed process in which the catalyst is used in the form of granules or pellets, or as a fluidised bed process, or as a moving bed process.

The proportion of propylene in the feed to the reaction may vary within fairly wide limits, for example, between 1 and 20 percent by volume of the feed, and suitably between 2 and 10 percent by volume.

It is preferred to use between 5 and 8 percent by volume of propylene in the feed.

The concentration of oxygen in the feed may also vary within moderately wide limits, for example, between 1 and 20 percent by volume. The oxygen may be diluted with inert gases, and may be, for example, supplied as air. The reaction is suitably carried out in the presence, as diluent, of a gas which is subsequently inert under the conditions of reaction, for example, nitrogen, propane, butane, isobutane, carbon dioxide and steam. It is preferred to carry out the reaction in the presence of steam or mixtures of steam and nitrogen. The concentration of the steam may vary within wide limits, for instance between 10 and 60 percent by volume of the feed.

The concentration of ammonia may also vary within moderately wide limits, for instance, between 2 and 10 percent by volume of the feed. If the maximum yield of acrylonitrile on propylene is required, it is desirable to use an excess of ammonia over propylene. For instance, the preferred concentration of ammonia is about 5–6 percent by volume of the feed where this contains 5 percent of propylene.

The reaction is carried out at an elevated temperature preferably below 550°C, e.g. between 350° and 500°C.

The contact time, defined as the volume of catalyst divided by the flow of gas per second calculated at room temperature and pressure, may be for example, in the range 1–30 seconds.

The reaction may be carried out at atmospheric pressure, or at super- or sub-atmospheric pressures. It is preferred to operate at a pressure of 1 to 5 atmosphere absolute.

The acrylonitrile may be recovered from the reaction products in any suitable manner, for example, by extraction with water, preferably at an acid pH, followed by fractional distillation. In one method the hot reaction gases are contacted firstly with a hot aqueous solution of sulphuric acid and ammonium sulphate which neutralises excess ammonia, secondly with cold water to extract the nitrile; the nitrile is subsequently recovered from the extract by fractional distillation. The process of the present invention is described in more detail with reference to the following examples. The atomic ratios of the metallic elements of the catalysts are given at the head of each example.

EXAMPLE 1

Catalyst Sb/Ti/Cu/Fe = 3/1/0.25/1

438 parts by weight antimony trioxide were stirred into 1876 parts water at 50°C and 60.6 parts Cu(NO$_3$)$_2$.3H$_2$O in 200 parts water and 405.6 parts Fe(NO$_3$)$_3$.9H$_2$O in 200 parts water were mixed together and then stirred in also. The mixture was brought to pH.6.3 by adding aqueous ammonia solution and after stirring for 15 min at 50°C, it was cooled to room temperature and filtered.

The filter cake was re-suspended in 2,600 parts water and after stirring for 1 h, hydrated titanium oxide was added and stirred for a further 2 h. The hydrated titanium oxide had been previously prepared by dissolving 284.8 parts of tetraisopropyl titanate in a mixture of 800 parts of water and 170 parts of 70% nitric acid, adding aqueous ammonia to pH 6.5 and filtering after stirring at 50°C for 30 min. The cake was washed by re-suspending in 3,200 parts water and filtering. The stirred mixture containing the antimony trioxide, copper and iron hydroxides and the hydrated titanium oxide was filtered, dried at 120°C until 15 percent water remained, passed through a coarse sieve and cake-breaker and pelleted to cylinders of 4 mm diameter and 4 mm length. The pellets were heat-treated in a furnace, in which the temperature was raised at 22°C per hour and in which an air stream was injected at a rate of 50 L/hr/kg catalyst. When the temperature reached 780°C, it was maintained for 16 hours and then cooled.

Testing of the catalyst in a glass reactor at 453°C with a feed of 5% propylene, 6% ammonia, 60% air and 29% steam (by volume) showed the following product yields:

| | |
|---|---|
| Acrylonitrile | 64.8 (molar on propylene fed) |
| acrolein | 0.9% |
| hydrogen cyanide | 6.7% |
| $CO_2$ | 14.8% |
| CO | 4.9% |
| unreacted propylene | 5.6% |

EXAMPLE 2.

Catalyst Sb/Ti/Cu/Fe = 3/1/0.25/1.5

The catalyst was prepared as in Example 1, excepting that the amount of $Fe(NO_3)_3 \cdot 9H_2O$ used was increased to provide for the greater iron content of the final catalyst. The catalyst was heat treated as previously except that the final temperature reached 810°C.

Testing the catalyst under the same conditions as in Example 1 at a temperature of 453°C resulted in the following product yields in molar percent based on the propylene fed.

| | |
|---|---|
| Acrylonitrile | 66.3% |
| acrolein | 0.7% |
| hydrogen cyanide | 7.1% |
| $CO_2$ | 11.6% |
| CO | 5.1% |
| unreacted propylene | 4.4% |

EXAMPLE 3 – 13

The catalysts were prepared as described in Example 1 omitting and/or replacing the relevant component compound or salt as necessary with the exceptions that the hydrated titanium oxide was co-precipitated with the other metallic hydro-oxides, rather than using the separate precipitation method used in Example 1. Data on the composition of the catalysts and their testing is shown in Table 1 for Examples 3 - 9 and in Table 2 for Examples 10 - 13.

Table 1

| Example | Catalyst Composition Sb/Ti/X/ 3/1/X/ | Heat treatment Temperature °C | Reaction Temperature °C | Yields (molar) on propylene fed (%) AN | $CO_2$ | recovered $C_3H_6$ | AN Efficiency % |
|---|---|---|---|---|---|---|---|
| 3 | X = 0.25 Cu | 780 | 492 | 37.9 | 4.6 | 45.5 | 69.5 |
| 4 | X = 0.25 Fe | 780 | 491 | 47.9 | 6.0 | 34.8 | 73.5 |
| 5 | X = 0.25 V | 780 | 412 | 52.6 | 14.0 | 5.7 | 55.8 |
| 6 | X = 1.0 Fe | 810 | 490 | 65.0 | 11.8 | 9.1 | 71.5 |
| 7 | X = 0.75 Co | 780 | 488 | 13.3 | 2.1 | 76.4 | 56.4 |
| 8 | X = 0.25 Mo | 780 | 462 | 36.2 | 11.5 | 21.0 | 46 |
| 9 | X = 0.25 W | 780 | 492 | 14.5 | 3.2 | 74.3 | 56.4 |

Table 2

| Example | Catalyst Composition Sb/Ti/X/Y 3/1/X/Y | Heat treatment Temperature °C | Reaction Temperature °C | Yields (molar) on propylene fed % AN | $CO_2$ | recovered $C_3H_6$ | AN Efficiency % |
|---|---|---|---|---|---|---|---|
| 10 | X/Y = 0.25 Fe/0.125 V | 780 | 430 | 66.1 | 14.4 | 0.4 | 66.4 |
| 11 | = 1.5 Fe/0.25 Cu | 830 | 479 | 68.0 | 7.5 | 9.8 | 75.5 |
| 12 | = 0.25 Cu/0.25 Cr | 830 | 500 | 51.0 | 12.9 | 23.3 | 66.5 |
| 13 | = 0.25 Cu/0.125 V | 780 | 459 | 72.1 | 11.3 | 1.6 | 73.3 | we claim:

1. A process for the production of acrylonitrile which comprises reacting at an elevated temperature in the vapor phase propylene, molecular oxygen and ammonia over a catalyst which is an oxide composition which is a mixture of oxides of the metal components or oxygen-containing compounds of such matals or a mixture of both and whose metallic components essentially consist of antimony, titanium, copper and an additional metal selected from the group consisting of chromium, molybdenum, tungsten, iron, cobalt and vanadium, said catalyst having been heat treated before use at a temperature between 550°-1100°C in a molecular oxygen containing gas and the atomic ratio of antimony to each of the other metals in said catalyst is 2:1 to 24:1.

2. A process as defined in claim 1 wherein said additional metal is iron.

3. A process as defined in claim 1 wherein said additional metal is chromium.

4. A process as define in claim 1 wherein said additional metal is vanadium.

5. A process for the production of acrylonitrile which comprises reacting at an elevated temperature in the vapor phase propylene, molecular oxygen, and ammonia over a catalyst which is an oxide composition which is a mixture of oxides of the metal components or oxygen-containing compounds of such metals or a mixture of both and whose metallic components essentially consist of antimony, titanium, iron and an additional metal selected from the group consisting of chromium, tungten, cobalt and vanadium, said catalyst having been treated before use at a temperature between 550°-1100°C, in a molecular oxygen containing gas and the atomic ratio of antimony to each of the other metals in said catalyst is 2:1 to 24:1.

6. A process as defined in claim 5 wherein said additional metal is vanadium.

* * * * *